Feb. 22, 1966    A. N. FALLOWS    3,236,981
BY-PASS SWITCH WITH PIVOTED CONTACTS AND ARC
PREVENTION APPARATUS
Filed Nov. 21, 1963    3 Sheets-Sheet 1
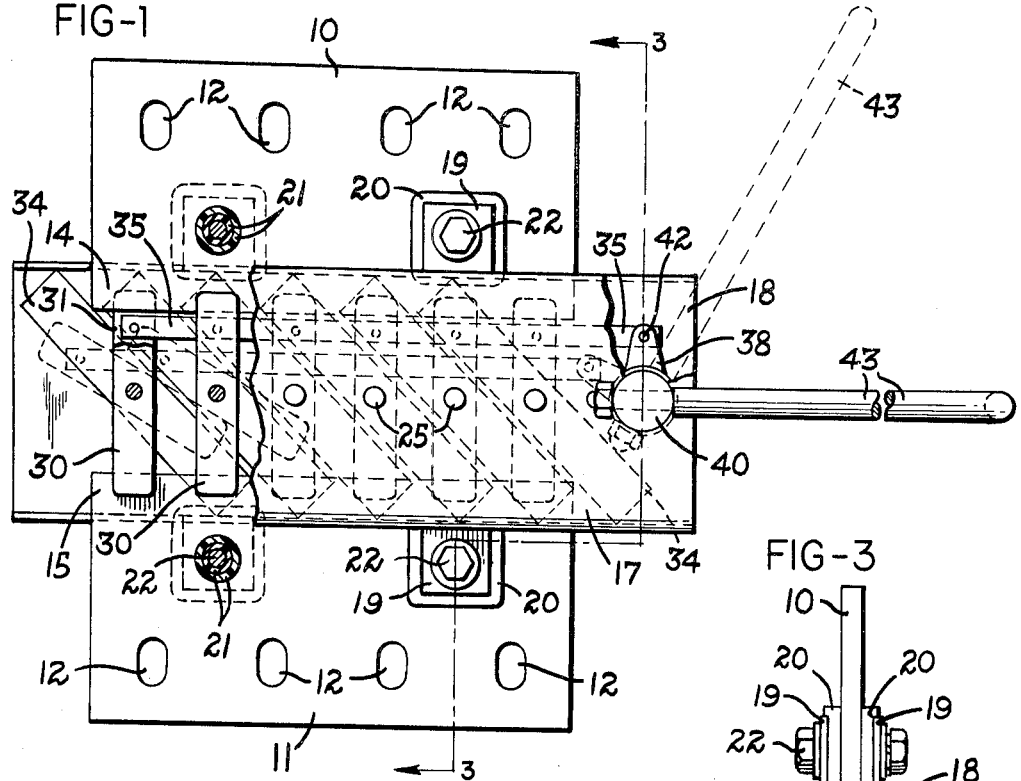
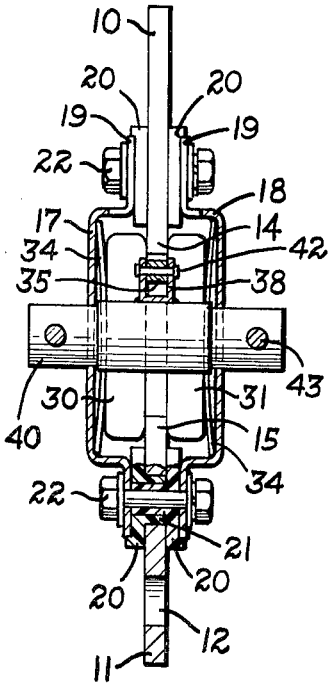
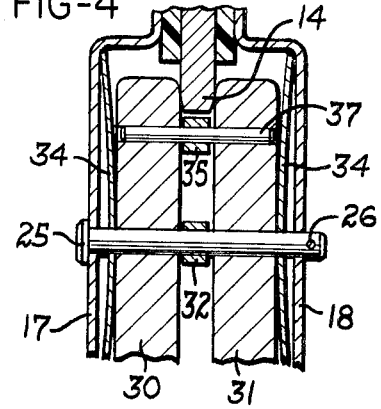
INVENTOR.
ALBERT N. FALLOWS
BY
Marchal, Biebel, French & Bugg
ATTORNEYS

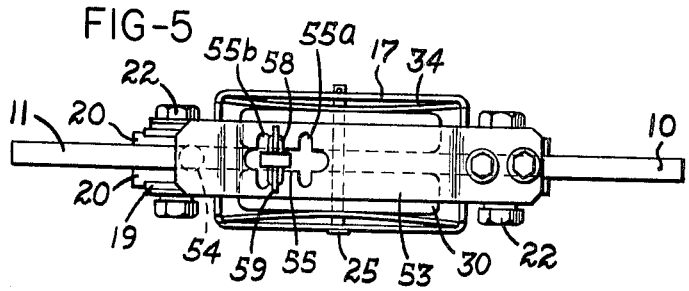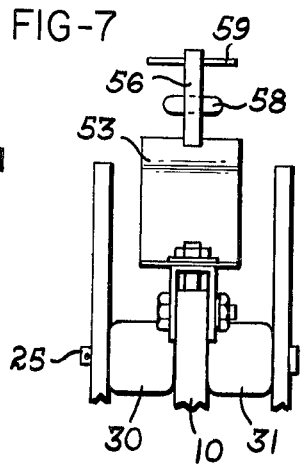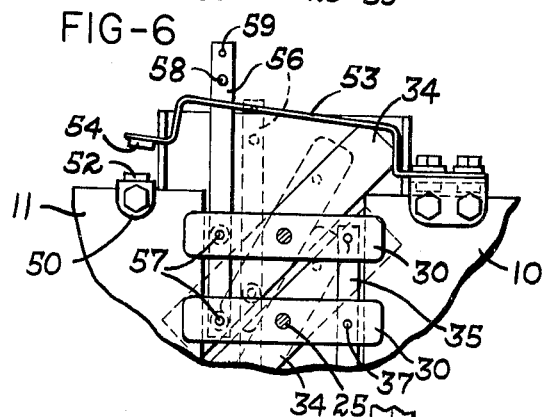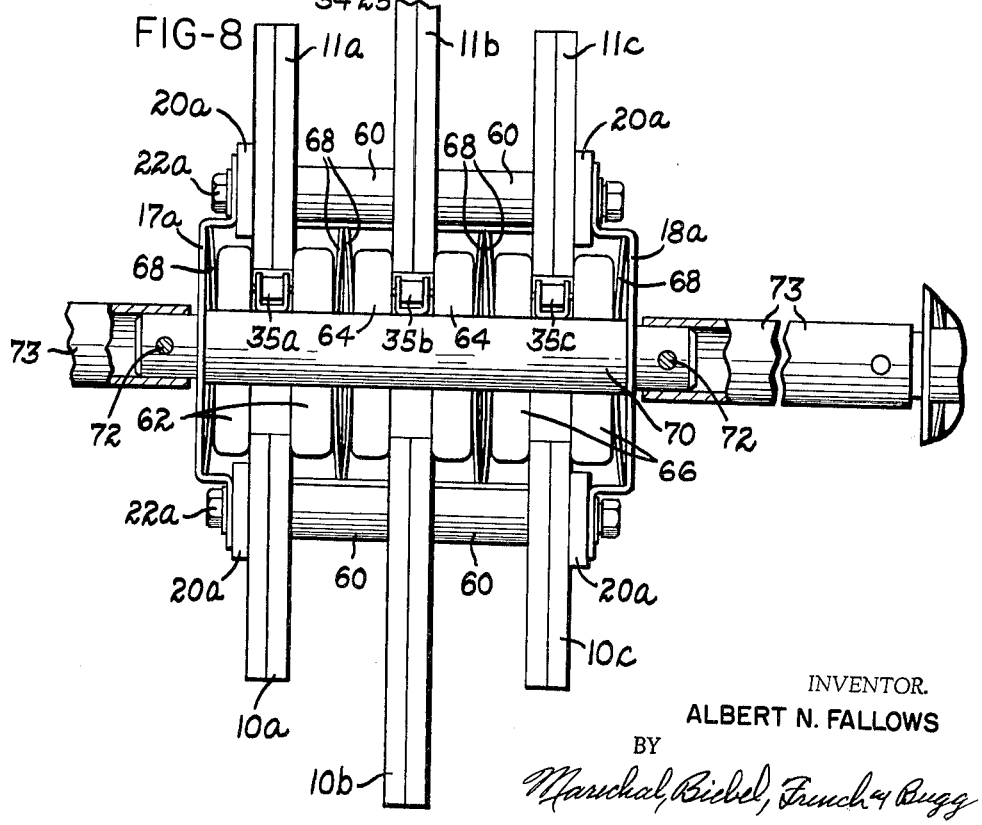

Feb. 22, 1966    A. N. FALLOWS    3,236,981
BY-PASS SWITCH WITH PIVOTED CONTACTS AND ARC
PREVENTION APPARATUS
Filed Nov. 21, 1963    3 Sheets-Sheet 3
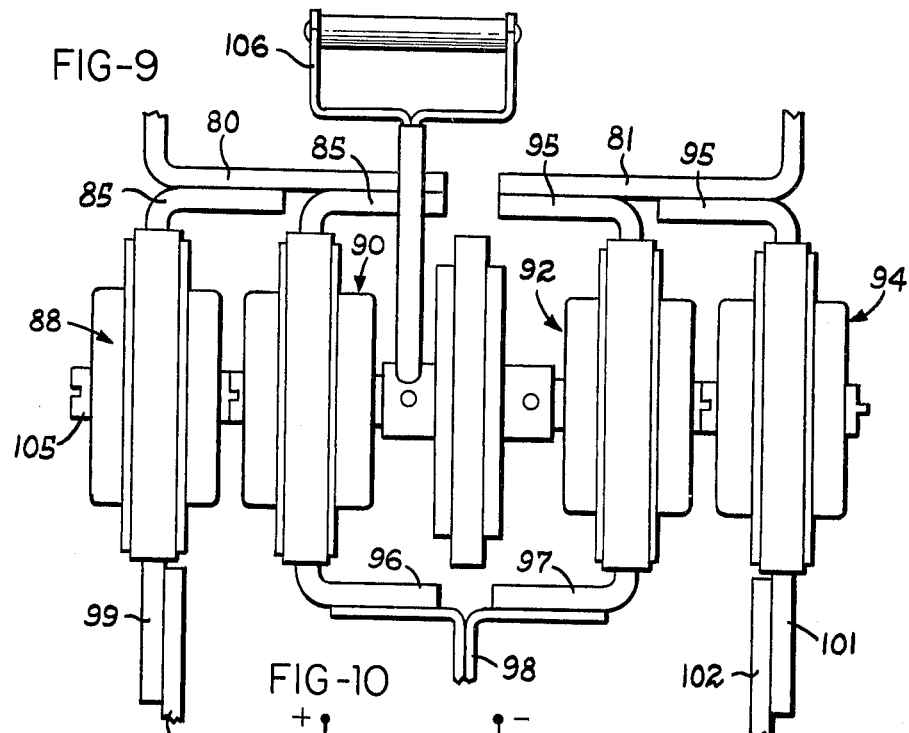
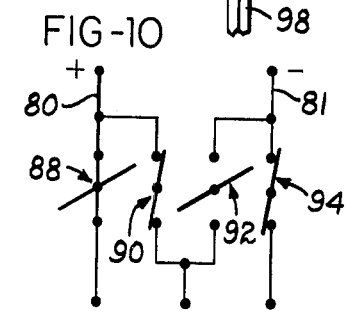
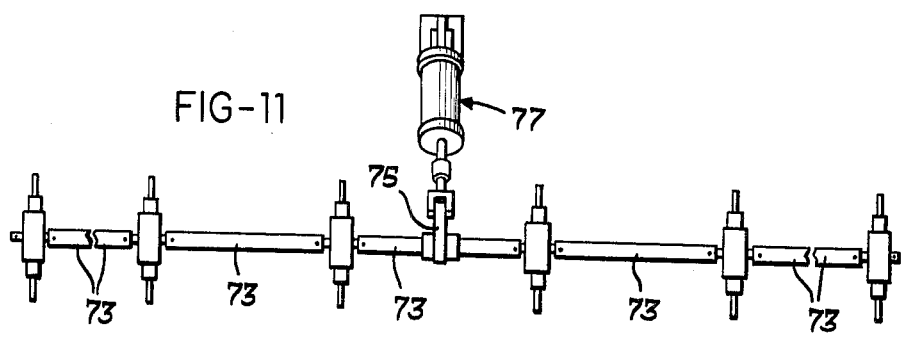
INVENTOR.
ALBERT N. FALLOWS
BY
Marechal, Biebel, French & Bugg
ATTORNEYS

# United States Patent Office 3,236,981
Patented Feb. 22, 1966

3,236,981
BY-PASS SWITCH WITH PIVOTED CONTACTS
AND ARC PREVENTION APPARATUS
Albert N. Fallows, Middletown, Ohio, assignor to The
Barkelew Electric Manufacturing Company, Middletown, Ohio, a corporation of Ohio
Filed Nov. 21, 1963, Ser. No. 325,250
6 Claims. (Cl. 200—146)

This invention relates to an electrical switch device, particularly a switch adapted for use in electrical circuits having relatively high current and relatively low voltage power requirements.

A switch according to the present invention has particularly utility in electrical circuits for short-circuiting or by-passing electrolytic cells, or used to isolate high current, low voltage electric power equipment, or for reversing the polarity of connections to such electric devices.

In the electrochemical process industry and in the electrolytic reduction of aluminum there is a requirement for an electrical switch device to by-pass or shunt the normal electric current out of and around an electrolytic process cell. With the current flowing around the cell rather than through it a cell can be safely drained of electrolyte and otherwise serviced without interrupting the flow of power through other cells connected in series with it. In certain instances, the by-pass switch must be closed very quickly to avoid damage to the cell or even possible explosion. Prior art switches for applications of this type have been termed cell-shorting switches, or they are sometimes called merely "cell switch." In this application the switch is usually mounted directly on the electrolytic cell, and need not be insulated from ground. Voltage across the switch when it is open is only the back E.M.F. of the electrolyte in the cell plus the resistance drop of the electrolyte and the associated anode and bus connections, in most instances less than 10 volts.

In the use of high power conversion equipment such as semiconductor rectifiers there is a requirement for a compact, high current disconnecting switch to provide a means of isolating the rectifier from the heavy direct current bus running to the load and to other parallel conversion equipment. It is frequently desirable to have a compact switch device which can be mounted inside the rectifier cubicle and inserted in the heavy bus bar leads without significantly distorting the bus bar configuration.

In the electroplating industry, there is a requirement for an electrical switch device to perform the function of reversing the polarity of the D.C. voltage applied to the terminals of the plating tank. Such a switch must be relatively compact and have a high current carrying capacity, but needs only withstand less than 10 volts D.C. in the open position.

There are a number of high-temperature thermal processes which employ high current, low voltage (less than 600 volts) electrical energy. In most of these processes, alternating current power is employed although direct current is sometimes more efficient due to the difference in reactive power loss. In an A.C. electric furnace or electric heating application it is important to minimize inductive reactance to improve power factor and efficiency. Interleaving of the A.C. bus bars is one means commonly used to minimize reactance. Interleaving is the arrangement of multiple laminations in alternately positive and negative polarities so that no two adjacent bars carry current instantaneously in the same direction. With the importance of close spacing of interleaved bus bars, it also is important that the switch be quite compact and fit into the so-called bus "run" with a minimum of distortion of the spacing and arrangement of the bus bars.

The present invention provides a novel switch device applicable to these and other uses, as will be apparent to those skilled in the art.

Accordingly, the primary object of the present invention is to provide a novel electrical switch device for controlling electrical circuits in which there is a capability of relatively high current flow, for example thousands of amperes, and at relatively low voltage, e.g. less than 600 volts and in many cases less than 10 volts.

Another object of this invention is to provide an electrical switch device of this nature which is of compact and economical construction, but which is of rugged construction which lends itself to long life and minimum maintenance, being less susceptible to maladjustment or mechanical failure than switching devices presently available for these types of service.

A further object of the invention is to provide an electrical switch device of the above mentioned type, which is of modular construction, thereby simplifying the arrangement of these switching devices in multiples.

An additional object of the invention is to provide a novel switch device of the above described character, wherein the switch terminals or contacts are mounted in fixed spaced relation, and a plurality of switch bars or blades are mounted to pivot in the space between contacts between a closed position where the bars form a plurality of low resistance electrical paths between the contacts, and an open position wherein the bars are separated from both contacts and hence are maintained in an electrically isolated condition when the switch is open.

Another object of the invention is to provide a novel high current capacity switch device in which the movable switch blades or bars are urged into face to face contacting relation with the stationary contacts of the switch, thereby assuring a wiping or cleaning action during opening and closing of the switch to promote good contact in which there is little electrical resistance.

Another object of the invention is to provide such a switch device of relatively open construction, wherein the space between the fixed contacts is transversed by a plurality of pivotally mounted switch bars or blades, and in which these bars are mounted on supporting plates which cooperate with the fixed contacts to form a tubular enclosure which may be arranged in any desired position to promote cooling, for example by arranging the tubular configuration vertically to promote a chimney effect which enhances the flow of material convection air currents.

An additional object of the invention is to provide in such a switch a novel arc diverting construction whereby during opening of the switch a parallel electrical path is provided between the stationary contacts until after all of the switch bars have separated from the contacts, thereby localizing arcing or sparking during opening of the switch to the locale of auxiliary contacts in such parallel path.

Other objects and advantages of the invention will be apparent from the following description, the accompanying drawings and the appended claims.

In the drawings:

FIG. 1 is a plan view, with some parts broken away and shown in section, of a typical switch device in accordance with the invention;

FIG. 2 is an end view, with some parts broken to shorten the illustration, as viewed for example from the top of FIG. 1;

FIG. 3 is a sectional view through the switch device taken on line 3—3 of FIG. 1;

FIG. 4 is an enlarged detail sectional view of a segment of the switch device as it appears in FIG. 3;

FIG. 5 is a side view of a similar switch device illustrating the application of an arc diverting arrangement;

FIG. 6 is a detail view of a segment of a similar switching device illustrating the application of an arc diverting arrangement;

FIG. 7 is an end view of the construction shown in FIGS. 5 and 6;

FIG. 8 is a side view of a modified form of switch in accordance with the invention, illustrating application of the invention to a construction where multiple contact plates or bars are arranged in a stacked configuration;

FIG. 9 is a view showing another form of the invention in which individual switch devices are mounted in a modular arrangement to form a polarity reversing switch;

FIG. 10 is a schematic diagram of the electrical circuit of the switch shown in FIG. 9; and FIG. 11 is a somewhat diagrammatic view showing the manner in which a number of switch devices in accordance with the invention can be operated from a common power source such as a pneumatic cylinder.

Referring to the drawings, which illustrate preferred embodiments of the invention, and particularly with reference to FIG. 1, the terminal tangs and stationary contacts of the switch are provided by a pair of bars or plates 10 and 11. Each of these having a number of elongated holes or slots 12 through which bolts or the like can be inserted to secure the terminals to bus bars or the like. The terminal plates 10 and 11 are supported in fixed spaced relation such that the contact portions 14 and 15 thereof are spaced apart a predetermined distance. The structure for so mounting and connecting the terminals includes a pair of complementary cover plates 17 and 18 whch may be stamped from metal or otherwise formed to the desired shape as shown in FIG. 3. Each of these plates is provided with outwardly extending ears 19, and between these ears of the covers there are insulator blocks 20, including telescoping bushing parts 21 (FIG. 3) which isolate the terminals electrically from the covers. These parts are clamped together by a plurality of bolt and nut fasteners 22 which extend through appropriate holes in the covers, the blocks 20, and the terminal plates 10 and 11. Each bolt is thus surrounded by an insulation in order to insulate the covers completely from the terminals.

A plurality of dowels or pins 25 extend through the covers and traverse the space between the terminals. Preferably these dowels have an enlarged head at one end, as shown in FIG. 4, and there is a retaining wire 26 holding the other ends of the dowels in position.

On these dowels there are mounted pairs of movable contact bars or blades which are identified by the reference numerals 30 and 31, and which are separated by a suitable spacer 32. There may be as many pairs of these contact bars as desired, depending upon the length of the terminals and the width of the individual contact bars. In the illustrated example there are six pairs of contact bars. On the outside of each contact bar, in other words between the bar and the adjacent cover plate, there is a leaf spring 34 which acts between the cover and the center of the contact bar tending to move the bar inwardly of the dowel. This relationship is best seen in FIG. 4.

Thus, with the contact bars overlapping the terminal contact portions 14 and 15, as shown in FIGS. 1, 3 and 4, these springs tend to promote face to face contact, over a substantial area, between the contact bars and the terminals. In addition, during opening and closing movement of the contact bars the pressure applied by the springs 34 has the desirable effect of causing the movable contacts to wipe over the stationary terminal portions and thus to tend to clean the mating switch surfaces of corrosion and any foreign matter. This promotes a low resistance, intimate contact between the movable and stationary contacts of the switch.

The motion of the movable contact bars can best be understood by reference to FIG. 1 where the pairs of contact bars are shown in closed position. A push rod 35 is pivotally attached to each pair of movable contact bars by a pin 37 (FIG. 4) which extends through the push rod and into suitable bores formed in the contact bars. Thus, longitudinal motion of push rod 35 will cause simultaneous swinging or pivoting motion of the movable contact bars between the closed position shown in full lines and the open position shown in dotted lines in FIG. 1. In the open position the pairs of contact bars 30, 31 each swing to extend at an angle across the space between the terminal contacts 14 and 15. The contact bars are clear of both terminal contacts as shown, thus effectively isolating the movable contact bars and all parts connected thereto from any electrical circuit.

Opening and closing movement is derived from the crank 38 which extends from a crank shaft 40 pivotally mounted in the cover plates 17 and 18 at one end of the switch assembly. The crank 38 has a pivotal connection to push rod 35 by means of a connecting pin or dowel 42. In the construction shown in FIGS. 1 and 2, a U-shaped handle 43 is fastened to the crank shaft 40 and provides for manual opening and closing of the switch. Any other convenient arrangement can be used for providing the opening and closing power. For example, the arm 43 can be connected to a remotely controlled pneumatic cylinder or any other suitable motor device.

FIGS. 5, 6 and 7 show a modified form of the switch incorporating an arc controlling or diverting device. While under low voltage conditions there is relatively short duration of arcing at the switch contacts, especially if they are opened fairly rapidly as would normally be the case, it may be desirable in some circumstances to provide an arc controlling arrangement to eliminate any arcing at the main contact bars. For this purpose, the stationary contact bracket 50 is fastened to the terminal plate 11, and it mounts a stationary contact 52. A movable spring arm 53 is mounted to the terminal plate 10, and the end of arm 53 carries a movable contact 54. The spring arm normally is in the open position shown in full lines in FIG. 6 when the switch is closed. The arm 53 together with contacts 54 and 52 and the mounting bracket 50 can form an electrical path between the terminal plates 10 and 11 which is parallel to the main movable contact bar pairs 30 and 31.

The spring arm 53 is provided with a slot 55 having widened or enlarged portions 55a and 55b, particularly as shown in FIG. 5. An operating rod 56 of insulating material is pivotally attached to the two closest pairs of contact bars by means of pins 57, as shown in FIG. 6, and thus this rod 56 remains parallel to the terminals as the bars are moved between open and closed positions, the extremes of which are shown in dotted and full lines, respectively, in FIG. 6. Assuming that the switch is closed, as the main contact bars are pivoted in an opening direction, a smaller cross pin 58 on the rod 56, specifically on the portion of the rod which extends through the spring slot 55, will engage the spring and carry the movable contact 54 into engagement with the stationary contact 52 before the main contact bars are separated from the stationary terminal plates. Thus, the arc diverting circuit is completed through these contacts and arm 53 before the switch is opened. The arrangement of these parts is such that as the opening movement of the switch continues the spring 53 will bow or deflect and thus substantial contact pressure is obtained between the arc diverting contacts 52 and 54. When the main contact bars have parted from the terminal plates, and thus the switch is open, further travel of the driving pin 58 will cause it to slide along the spring 53 until it reaches the enlarged slot portion 55a, and at this point the spring 53 acts to move the contact 54 abruptly away from the stationary contact 52. Therefore, the arc diverting contacts are opened rapidly.

During the momentary interim period following opening of the main contacts, the parallel arc diverting circuit maintains a complete circuit of much higher resistance between the terminals, and this circuit is subsequently broken at the contacts 52, 54. Any arcing that results can be compensated by the use of appropriate contact materials for the construction of the contacts 52 and 54, and in fact these contacts can be considered sacrificial since they may readily be replaced if they might become eroded due to arcing. This arrangement prevents arcing between the main elements of the switch and thereby eliminates any maintenance problem in this regard with respect to the main switch components.

During the switch closing operation, the driving pin 58 moves transversely along the underside of spring arm 53 until it encounters the widened opening 55b, at which time the driving pin moves through to the outer side of the spring arm 53 and is ready for the next switch opening operation. The rod 56 also carries a longer snubber pin 59, too wide to pass through any portion of the slots in the spring arm 53. This pin acts as a damping arrangement to minimize vibration of the moving arc diverting contact 54, and particularly to avoid the possibility of this contact restriking the stationary contact 52 after the arc diverting circuit has been opened at the end of a switch opening operation.

FIG. 8 shows another form of switch conrtructed in accordance with the invention. Actually, this arrangement represents a multiplication of the basic switch elements. Here, there are three main terminal plates indicated as 11a, 11b and 11c on the one side, and 10a, 10b and 10c on the other. These contact plates may be separated from each other by suitable spacers 60 which are aligned with the main retaining fasteners 22a of the switch construction. It will be apparent that these fasteners, although longer, correspond to the fasteners 22 in FIGS. 1, 2 and 3. Similarly, the insulating blocks or plates 20a are of the same type as the insulating plates 20, and the covers 17a and 18a correspond to the covers 17 and 18.

The movable switch bars are likewise provided in pairs. These are indicated by the pairs of bars 62, 64 and 66. The contact pressure springs 68 are provided not only between the covers and the outer contact bars 62 and 66, but also between adjacent ones of the bars 62 and 64, and 64 and 66.

In the same manner as shown particularly in FIG. 1, there may be any desired number of pairs of contact bars, and only one pair in each of the three sections of the modified switch is shown in FIG. 8, which is an end view of the modified construction.

A common operating crank shaft 70 is mounted between the end plates 17a and 18a, and this crank shaft is connected to the repsective pairs of movable switch contact bars by the push rods 35a, 35b and 35c such that rotation of the crank shaft will move all of the pivotable contact bars in unison. Likewise, the ends of the crank shafts can be connected through suitable cross pins 72 to tubular extensions 73 such that a number of these switches, such as shown in FIG. 8, can be interconnected for simultaneous operation.

An arrangement of this general type is shown in FIG. 11, wherein the tubes 73 joining the various switches are rotated by means of an operating crank 75 which in turn is driven by a pneumatic cylinder or similar motor device 77.

A somewhat different arrangement of switches in accordance with the invention is shown in FIG. 9. Here, four switches such as shown in FIGS. 1–4 are interconnected to form a polarity reversing switch. The D.C. input is provided by the bus bars 80 and 81, which are also shown schematically in FIG. 10. Two switch devices in accordance with the invention have one terminal plate, indicated at 85, connected to the bus bar 80. These switches are indicated respsectively by the general reference numerals 88 and 90. Similarly, the other two switch devices 92 and 94 have terminal plates 95 which are connected to the input bus bar 81.

The switches 90 and 92 have their output terminals 96 and 97 connected to a common bus bar 98 which represents the common output terminal. The switch 88 has its output terminal 99 connected to one of the output bus bars 100, and switch 94 has its output terminal 101 connected to the output bus bar 102.

The contact bars of the various switches 88–94 are interconnected by sectional operating shafts, which are indicated by the common reference numeral 105, and these are intended to be rotated in unison by an operating handle 106. The contact bars of these switches are so phased with respect to each other that when switches 88 and 92 are open switches 90 and 94 are closed, and vice versa.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. In a high capacity electrical switch adapted particularly for use in high current low voltage applications, the combination of a pair of terminal plates extending in a common plane and mounted with parallel edges thereof in spaced relation forming stationary switch contacts, support plates extending across said space between said contacts on opposite sides thereof and insulator means mounting said support plates in electrically insulated relation to said terminal plates, a plurality of pivot pins extending between said support plates generally through the center of said space between said contacts to form a row of aligned switch pivots, a pair of movable switch bars mounted on each of said pins, spacer means between each said pair of bars having a thickness slightly less than the thickness of said stationary switch contacts, spring means acting between said support plates and said switch bars of each said pair urging said bars toward the associated spacer means to cause a spacing of said switch bars no greater than the thickness of said stationary contacts during engagement of said bars with said contacts, and operator means connecting all of said pairs of bars for concurrent pivoting movement between an open position wherein said switch bars are clear of each of said contacts and a closed position wherein each pair of switch bars overlaps a stationary contact at each end of the pair to form a plurality of low electrical resistance parallel paths between said stationary contacts.

2. In a switch as defined in claim 1, an arc prevention device including a first contact mounted on an end of one of said terminals and a movable contact arm extending from the associated end of the other terminal, a second contact on said arm arranged to engage said first contact with said pairs of switch bars in the closed position forming a separate electrical path between said terminals, and means operable by said switch bars and engaged with said arm to separate said contacts after said switch bars have reached a position out of contact with the stationary contact portions whereby said separate path is broken through said first and second contacts after all of said switch bars have reached an open position.

3. In a high capacity electrical switch the combination of a pair of terminal contact plates extending in a common plane and mounted with parallel edges thereof in spaced relation forming stationary switch contacts, support plates extending across said space between said contacts on opposite sides thereof, insulator means between said support plates and said contact plates, means fastening said plates and said insulator means in assembled condition with said support plates forming a tunnel-like cover around the stationary switch contacts, a plurality of pivot pins extending between said support plates through the space between said stationary contacts to form a row of aligned switch pivots, a pair of movable switch bars mounted on each of said pins, spring means acting between said support plates and said switch bars of each said pair urging said bars toward said stationary contacts during engagement of said bars with said contacts, and operator means connected to pivot all of said pairs of bars concurrently.

4. A switch as defined in claim 3, including in said operator means a push rod connected to each pair of movable switch bars and a common operating crank connected to move said push rod whereby all of said pairs of bars are pivoted concurrently between open and closed positions.

5. In a high capacity electrical switch the combination of associated pairs of terminal contact plates, each pair extending in a common plane and mounted with edges thereof in spaced relation forming stationary switch contacts and the pairs of plates being parallel to each other with the space therebetween aligned, support plates extending across said space between said contacts on opposite sides of the outermost of said insulator means positioned between all of said plates, fastener means holding said plates and insulator means in stacked relation, a plurality of pivot pins extending between said support plates and through all of said aligned spaces between said contacts to form a row of aligned switch pivots, pairs of movable switch bars mounted on each of said pins for each of said pairs of contact plates, spring means acting on said switch bars of each said pair urging said bars toward the associated said stationary contacts during engagement of said bars with said contacts, and operator means connecting all of said pairs of bars for concurrent pivoting movement between an open position wherein said switch bars are clear of each of the associated said contacts and a closed position wherein each pair of switch bars overlaps a stationary contact at each end of the pair to form a plurality of low electrical resistance parallel paths between associated stationary contacts.

6. In an electrical switch for controlling low voltage electrical circuits in which high current flow is required, the combination of a pair of terminals having contact end portions mounted in spaced parallel relation with said terminals having at least the contact end portions thereof arranged in a common plane, mounting means for said terminals maintaining them in electrically insulated relation, at least one switch bar pivotally mounted between said terminals, operating means connected to said switch bar providing for selective pivoting movement thereof between an open position wherein said bar extends diagonally across the space between said contact portions and out of contact therewith and a closed position wherein said bar is engaged with said contact portions of said terminals to form a low resistance electrical path between said terminals, an arc diverting circuit including a first contact on one of said terminals, an arm extending from the other of said terminals and carrying a second contact normally spaced from said first contact, and mechanism operative in response to action of said operating means pivoting said bar from its closed to its open position to force said arm toward said first contact and to close said first and second contacts prior to complete opening of said bar and to separate said first and second contacts after said bar is completely separated from said contact portions of said terminals.

No references cited.

KATHLEEN H. CLAFFY, *Primary Examiner.*

J. R. SCOTT, *Assistant Examiner.*